(12) United States Patent  (10) Patent No.: US 6,793,346 B2
Nakano et al.  (45) Date of Patent: Sep. 21, 2004

(54) PROJECTOR (75) Inventors: Hirohisa Nakano, Matsumoto (JP);
Kazuhiro Nishida, Matsumoto (JP);
Masahide Tsuda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/347,265

(22) Filed: Jan. 21, 2003

(65) Prior Publication Data

US 2003/0164926 A1 Sep. 4, 2003

(30) Foreign Application Priority Data

Jan. 23, 2002 (JP) ........................................ 2002-014827

(51) Int. Cl.⁷ ........................... G03B 21/00; G03B 21/13
(52) U.S. Cl. ...................................... 353/119; 353/122
(58) Field of Search ........................... 353/57, 101, 119, 353/122, 31, 46

(56) References Cited

U.S. PATENT DOCUMENTS 6,428,170 B1 * 8/2002 Haba ........................... 353/119
RE38,006 E * 2/2003 Furuhata ...................... 353/31
6,527,392 B1 * 3/2003 Takizawa et al. ............. 353/34

FOREIGN PATENT DOCUMENTS

JP        A 8-304739        11/1996

* cited by examiner

*Primary Examiner*—Christopher Mahoney
(74) *Attorney, Agent, or Firm*—Oliff & Berridge, PLC (57) ABSTRACT

A projection lens (46) is located at an end of an optical unit (4) of approximately planarly-viewed L-shape, the projection lens enlarging and projecting a color image combined by a cross dichroic prism of an optical device body and including a linearly-advancing barrel (46B) fixed to a head (49) formed on an optical component casing, a cam barrel (46C) provided with a lever (46A), zoom-magnification converting lenses, focus-adjusting lenses and fixed lens, the linearly-advancing barrel (46B) and the cam barrel (46C) being made of polycarbonate, where a control board is disposed above a projection lens (46) to planarly cover the projection lens (46).

5 Claims, 11 Drawing Sheets

PROJECTOR

BACKGROUND OF THE INVENTION

1. Field of the Invention

The present invention relates to a projector having a control board for importing image information to project an optical image in accordance with the image information, and a projection lens composed of a plurality of beam-condensing elements.

2. Description of Related Art

Conventionally, a projector has been used for presentation at a conference, scientific society and exhibition. Such projector forms an optical image by modulating a light beam irradiated by a light source with an optical modulator in accordance with image information to enlarge and project the optical image.

Ordinarily, a projector has a projection optical system constructed by zoom-magnification-converting lenses and focus-adjusting lenses for enlarging and projecting an optical image modulated by the optical modulator, the mutual position of the lenses being changed to convert the magnification and adjust the focus of the projected image.

A lens-barrel for housing such projection optical system is constructed by a metal component for securing strength against external force.

Further, size and weight reduction is required for improving performance and enhancing portability of the projector, so that the electronic components constituting the projector come to be highly densely installed.

Such projector has a control board installed with a CPU for control and arithmetic processing, thereby controlling the optical modulator etc. in accordance with the image signal inputted from the outside.

The CPU, memory etc. installed on the control board continually consume electric current at a high frequency, causing strong radiation of electromagnetic wave.

Further, electronic components such as a power source having a transformer for transforming a voltage inputted from the outside into a predetermined voltage and a lamp driving circuit are provided on the projector, the electric components such as the power source and the lamp driving circuit also generating strong radiation of electromagnetic wave.

In order to avoid electromagnetic interference of the electromagnetic radiation to the electronic components inside the projector or the other electronics on the outside of the projector, the electronic components of the control board and the inside of the projector are electromagnetically shielded by a shield member made of aluminum etc. and/or an exterior case of metal or synthetic resin plated with metal.

However, on account of design of the shield component attached to the electromagnetic wave radiation and arrangement for enhancing shielding performance, the shielding structure becomes complicated and hinders size reduction of projector.

In order to reduce the size of the projector, the shield member around the control board may be removed. However, since the lens-barrel of the projection lens is made of metal, when the control board and the lens-barrel come close with each other, the circuit elements such as CPU and memory installed on the control board electromagnetically couple with the lens-barrel and, when the lens-barrel is resonated, secondary radiation of electromagnetic wave is caused with the lens-barrel as an antenna. Similarly, when the other electronics components constituting the projector and the lens-barrel of the projection lens are adjacently provided, the electronics components and the lens-barrel are electromagnetically coupled, thus causing secondary radiation of electromagnetic wave.

Accordingly, electromagnetic interference is caused on the electronic components inside the projector or the electronics outside the projector by the secondary radiation of the electromagnetic wave generated by the lens-barrel.

Further, when the lens-barrel of the projection lens is made of metal, the weight of the lens-barrel increases, thus spoiling weight reduction of a projector.

SUMMARY OF THE INVENTION

An object of the present invention is to provide a projector capable of preventing secondary radiation of electromagnetic wave caused by inside components to avoid electromagnetic interference while achieving size and weight reduction.

A projector according to an aspect of the present invention has: an electric optical device that modulates a light beam irradiated by a light source in accordance with image information; a projection lens that enlarges and projects the light beam modulated by the electric optical device; and a control board that controls the electric optical device in accordance with the image information, where the projection lens has a plurality of beam-condensing elements and a lens-barrel that houses the plurality of beam-condensing elements, where the control board is disposed adjacent to the projection lens, and where the lens-barrel is made of non-metal member.

The non-metal member may preferably be a plastic member such as polycarbonate and Cool Poly (RS007).

According to the present invention, since the control board for controlling the electric optical device in accordance with image information is provided, the control board being located adjacent to the projection lens composed of a plurality of beam-condensing elements and a lens barrel that houses the plurality of beam-condensing elements, the lens barrel being made of the above plastic member, the weight of the lens barrel can be reduced, thus reducing the weight of the projector.

Further, if the shield member provided adjacent to the control board is removed for reducing the size of the projector, since the lens barrel is made of the above plastic member, there is no electromagnetic coupling between the lens barrel and the circuit elements such as CPU and memory even when the circuit elements such as the CPU and memory installed on the control board and the lens barrel are closely located, thereby avoiding secondary radiation of the electromagnetic wave caused when the lens barrel is electrically resonated to work as an antenna.

Further, even when the other electronics component constituting the projector and the lens barrel of the projection lens are closely disposed, there is no electromagnetic coupling between the other electronics components and the lens barrel of the projection lens, thereby preventing influence of the secondary radiation of the electromagnetic wave from the lens barrel on the circuit elements installed on the control board such as CPU and memory, thus avoiding disturbance of projected image and malfunction.

Accordingly, the size and weight of the projector can be reduced and secondary radiation of the electromagnetic wave by the lens barrel in which the projection lens is housed can be avoided, thus sufficiently preventing electromagnetic interference.

In the projector of the present invention, the control board may preferably be located along a plane defined by an optical path from the light source to the projection lens, the control board planarly covering the lens barrel.

According to the above arrangement, since the control board is disposed along the plane defined by the optical path from the light source to the projection lens, the thickness of the projector can be reduced.

Further, since the control board is disposed to planarly cover the lens barrel, the accommodation efficiency of the control board can be improved, thus enhancing size reduction of the projector.

In the projector of the present invention, the distance between a circuit element installed on the control board and the lens barrel may preferably be within forty millimeters.

Usually, the shorter the distance between the components that radiates electromagnetic wave and the component as an antenna for receiving the electromagnetic wave, the more likely electromagnetic coupling is caused, and the antenna component causes secondary radiation of the electromagnetic wave by resonation after receiving electromagnetic wave of a predetermined frequency.

When the lens barrel is made of metal and no shield member is interposed between the lens barrel and the control board, the distance between the circuit elements radiating electromagnetic wave and the lens barrel has to be set sufficiently wide.

Since the lens barrel is composed of non-metal member as an insulator, even when the distance between the circuit element and the lens barrel is within forty millimeters, the lens barrel does not work as an antenna for the circuit elements that radiates electromagnetic wave, thereby causing no secondary radiation of the electromagnetic wave.

Further, even when the lens barrel is disposed adjacent to the other electronics components, the lens barrel does not work as an antenna for the electromagnetic radiation from the other electronics components, thus avoiding influence of the secondary radiation of the electromagnetic wave on the CPU or memory on the control board located closely to the lens barrel, thus preventing disturbance of projected image and malfunction.

Accordingly, the circuit elements and the lens barrel can be closely located within forty millimeters, the design inside the projector can be facilitated and the size of the projector can be reduced.

In the projector according to the present invention, an optical component casing that houses optical components disposed on an optical path from the light source to the electric optical device may preferably be provided, where a base end of the lens barrel may preferably be fixed to a head formed on the optical component casing, the head being formed of a non-metal member.

The non-metal member may preferably be a plastic member such as polycarbonate and Cool Poly (RS007) as described above.

According to the above arrangement, since the base end of the lens barrel is fixed to the head formed on the optical component casing and the head is made of the above-described plastic member, the head does not work as an antenna for the electromagnetic wave radiated by the circuit elements on the control board or the other electronics components inside the projector, thereby preventing secondary radiation of the electromagnetic wave by the head.

Further, since the head is made of the above-described plastic member, the weight of the head can be reduced, thus reducing the weight of the projector.

In the projector of the present invention, a cooling fan may preferably be located adjacent to the lens barrel.

Since the internal components are installed with high density in accordance with size reduction of the projector, heat is likely to reside inside the projector.

Since the cooling fan is located adjacent to the lens barrel, the temperature of the lens barrel can be prevented from becoming high on account of the heat conduction or thermal radiation from the heating element disposed inside the projector, thus preventing physical deformation of the lens barrel on account of high temperature of the lens barrel.

DETAILED DESCRIPTION OF PREFERRED EMBODIMENT(S)

An embodiment of the present invention will be described below with reference to the attached drawings.

[1. Primary Arrangement of Projector]

Figure 1:
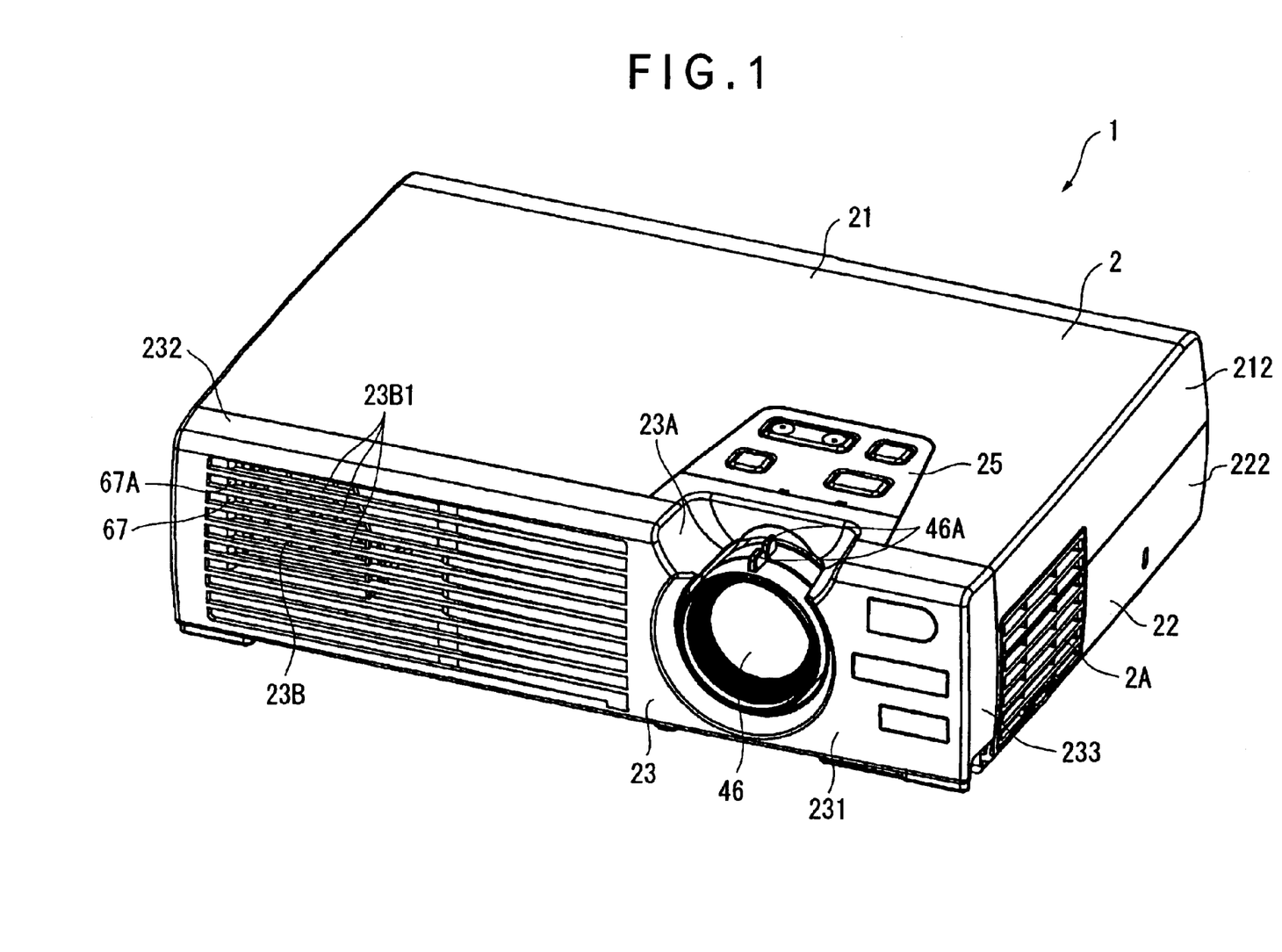
FIG. 1 is an entire perspective view of a projector seen from above according to an embodiment of the present invention.
Figure 2:
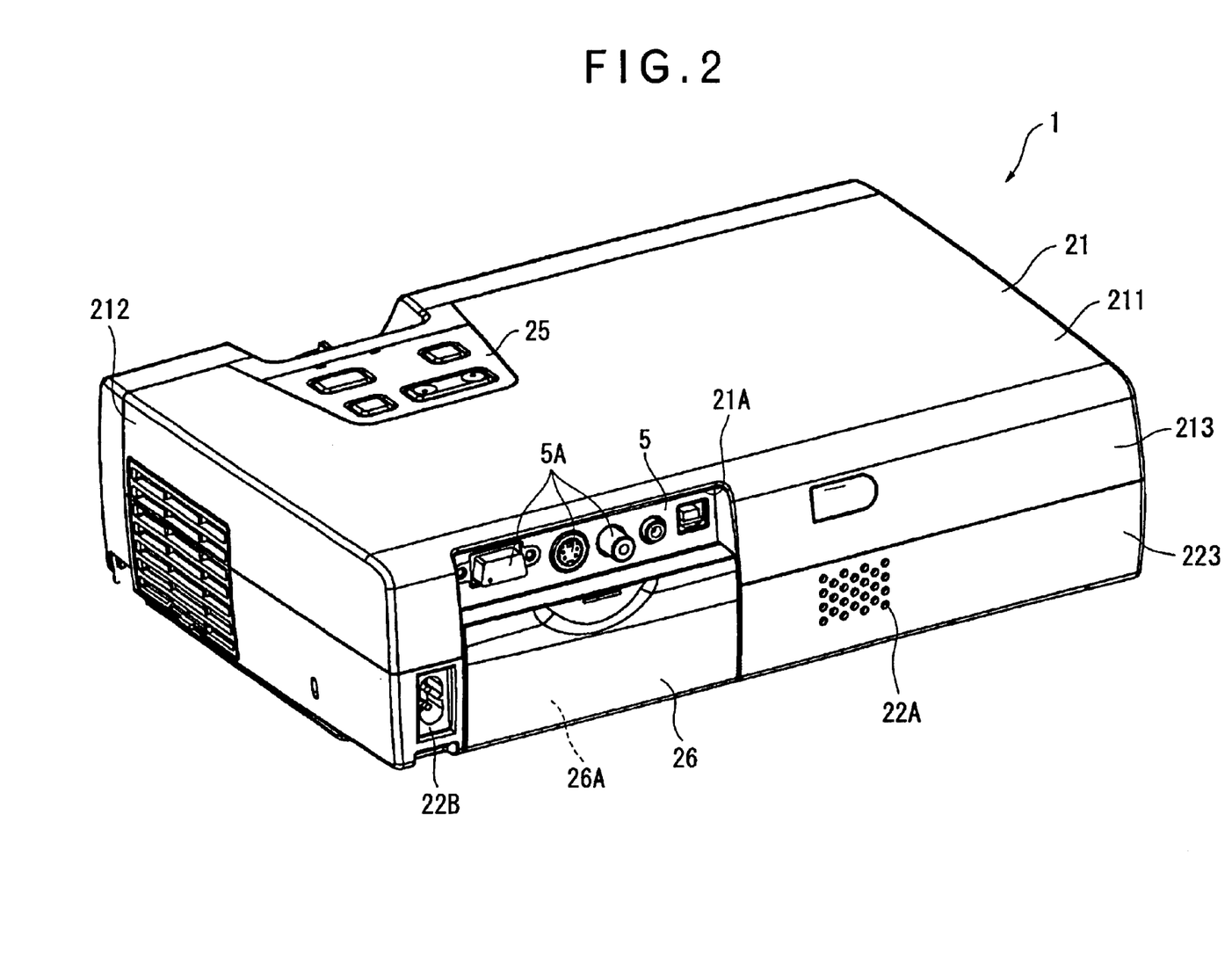
FIG. 2 is an entire perspective view of the projector seen from back side according to the aforesaid embodiment.
Figure 3:
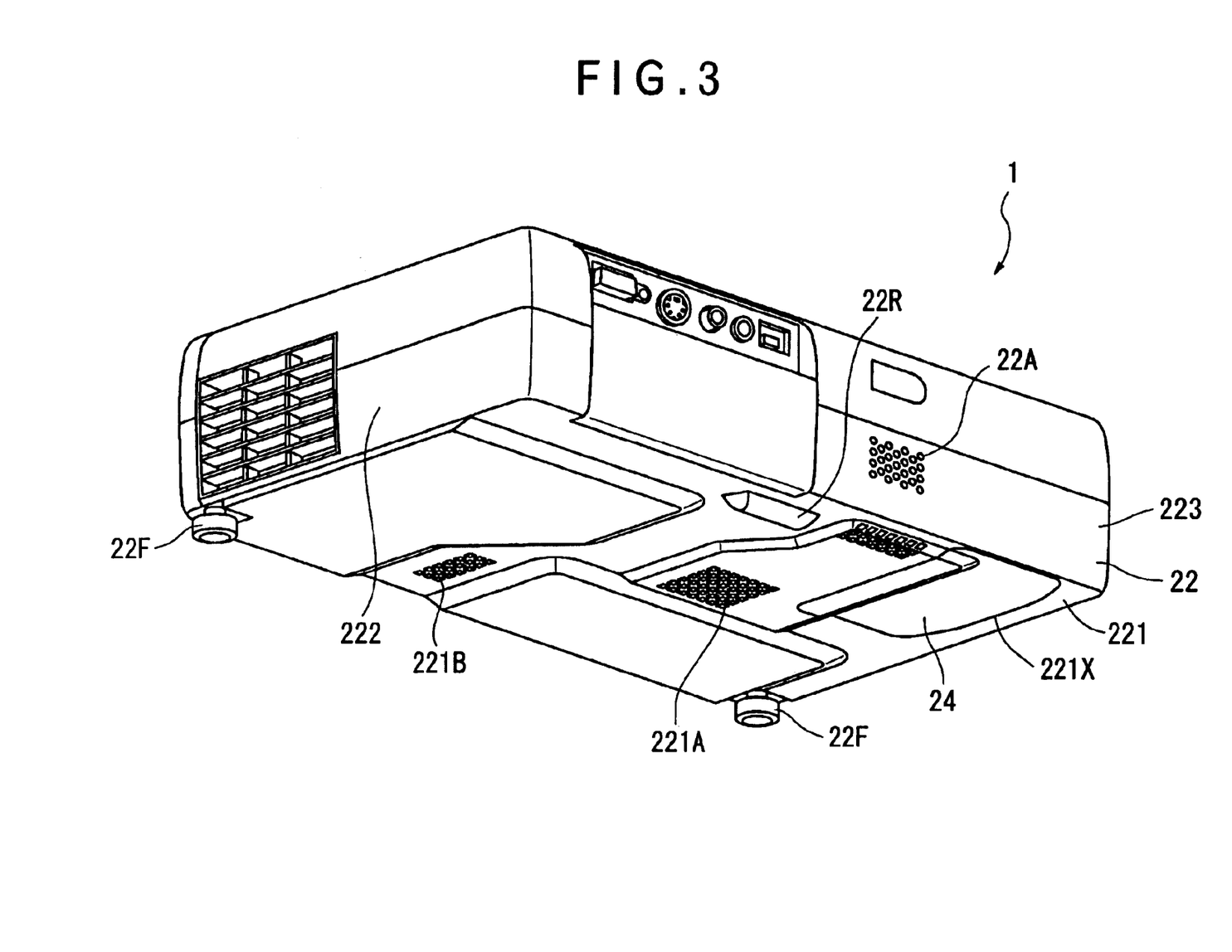
FIG. 3 is an entire perspective view of the projector seen from below according to the aforesaid embodiment.

FIG. 1 is a perspective view of a projector 1 seen from above according to an embodiment of the present invention. FIG. 2 is a perspective view of the projector 1 seen from back side. FIG. 3 is a perspective view of the projector 1 seen from below.

As shown in FIGS. 1 to 3, the projector 1 has an exterior case 2 of approximately rectangular parallelepiped.

The exterior case 2 is a casing for housing a body of the projector 1, which includes an upper case 21, a lower case 22 and a front case 23 spanning over the front side of the cases 21 and 22. The cases 21 to 23 are respectively made of synthetic resin material.

As shown in FIG. 2, the upper case 21 includes an upper portion 211, a side portion 212 and a rear portion 213 respectively constituting the top side, lateral side and rear side of the projector 1.

An operation panel 25 is provided on the front side of the upper portion 211.

A recess 21A spanning over the rear side of the upper portion 211 and the rear portion 213 is formed on the back side of the operation panel 25 on the upper case 21. A part of a control board 5 housed in the exterior case 2 is exposed to the outside from the recess 21A. The part of the control board 5 exposed to the outside is various connectors 5A constituting an interface. External devices are connected to the projector 1 through the connectors 5A.

As shown in FIG. 3, the lower case 22 includes a bottom portion 221, a side portion 222 and a rear portion 223 respectively constituting the bottom side, lateral side and rear side of the projector 1.

An opening 221X is formed on the bottom portion 221. A lamp cover 24 fitted to the rectangular opening 221X in a detachable manner. Further, inlet holes 221A and 221B for inhaling the cooling air from the outside are formed on the bottom portion 221.

A rear leg 22R constituting one of the legs of the projector 1 is formed approximately at the center on the rear side of the bottom portion 221. Further, front legs 22F also constituting the legs of the projector 1 are respectively provided on the right and left corners on the front side of the bottom portion 221. In other words, the projector 1 is supported on three points by the rear leg 22R and the two front legs 22F.

The two front legs 22F are vertically advanceable and retractable for adjusting the tilting (attitude of the projector 1) in front and rear directions and right and left directions to adjust position of the projected image.

As shown in FIG. 2, a remote controller storage 26 is formed on the rear portion 223 under the connector 5A. A remote controller 26A for remotely operating the projector 1 is housed in the remote controller storage 26.

Further, in FIG. 2, a speaker hole 22A is formed on the right of the remote controller storage 26 on the rear portion 223 and an inlet connector 22B is provided on the left of the remote controller storage 26.

As shown in FIG. 1, the front case 23 includes a front portion 231, a top portion 232 and a side portion 233 respectively constituting the front side, top side and lateral side of the projector 1.

An opening 23A spanning over the front portion 231 and the top portion 232 is formed on the front case 23. A projection lens 46 is disposed inside the exterior case 2 corresponding to the opening 23A. A part of the projection lens 46 is exposed to the outside from the opening 23A, so that zooming operation and focusing operation of the projection lens 46 can be manually conducted through a lever 46A as a part of the exposed portion.

An exhaust hole 23B is formed on the front portion 231 on a side opposite to the opening 23A. A plurality of horizontally arranged vanes 23B1 are formed on the exhaust hole 23B, the vanes 23B1 regulating the cooling air discharged from the exhaust hole of an exhaust duct 6B and blocking the light from the inside and the outside.

As shown in FIG. 1, an inlet hole 2A spanning over the side portion 212 of the upper case 21 and the side portion 222 of the lower case 22 is formed on the lateral side of the exterior case 2. A sirocco fun not illustrated in FIGS. 1 to 3 is provided inside the inlet hole 2A.

Figure 4:
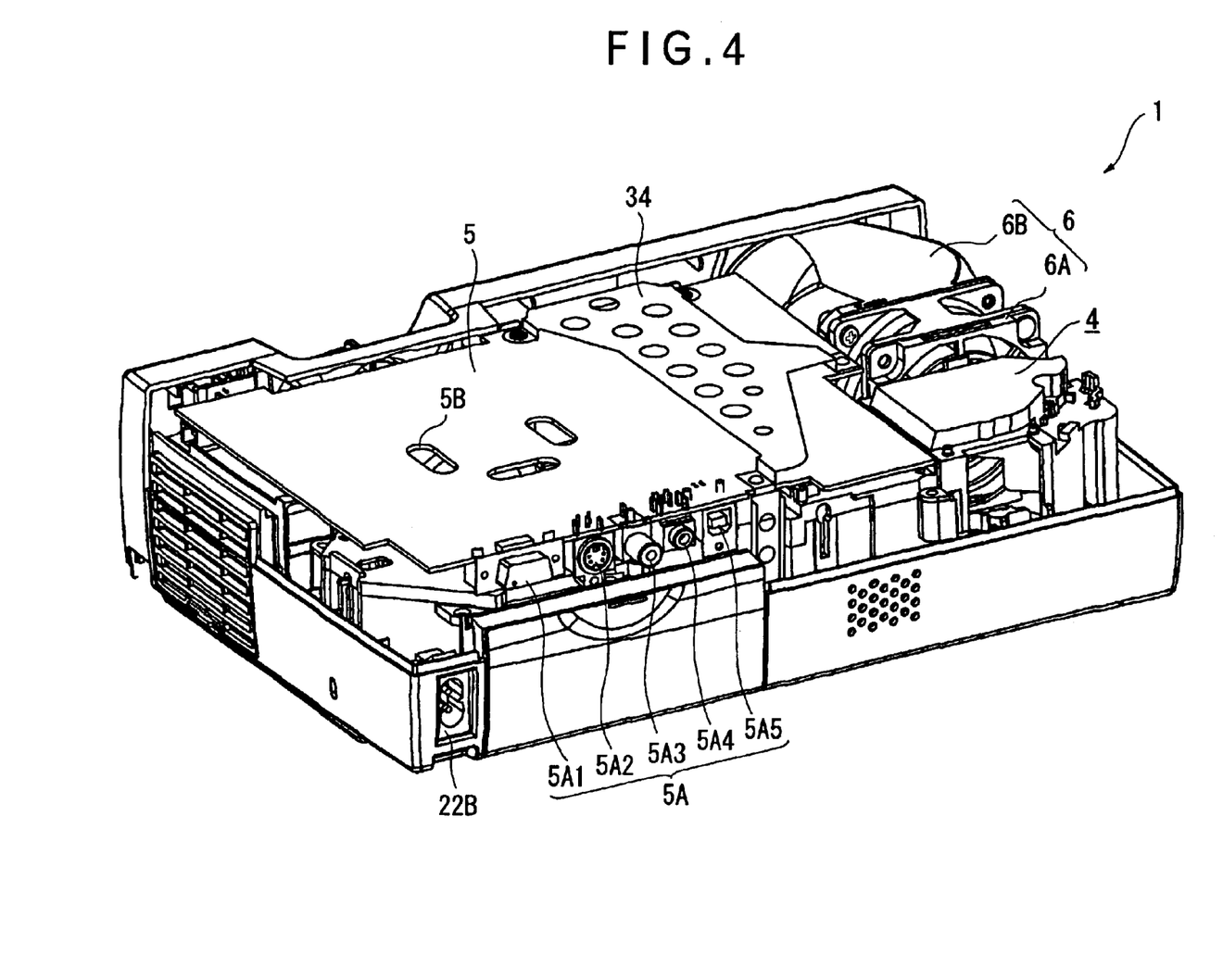
FIG. 4 is a perspective view showing the inside of the projector according to the aforesaid embodiment, which specifically shows the projector with upper case thereof being removed from the condition shown in FIG. 2.
Figure 5:
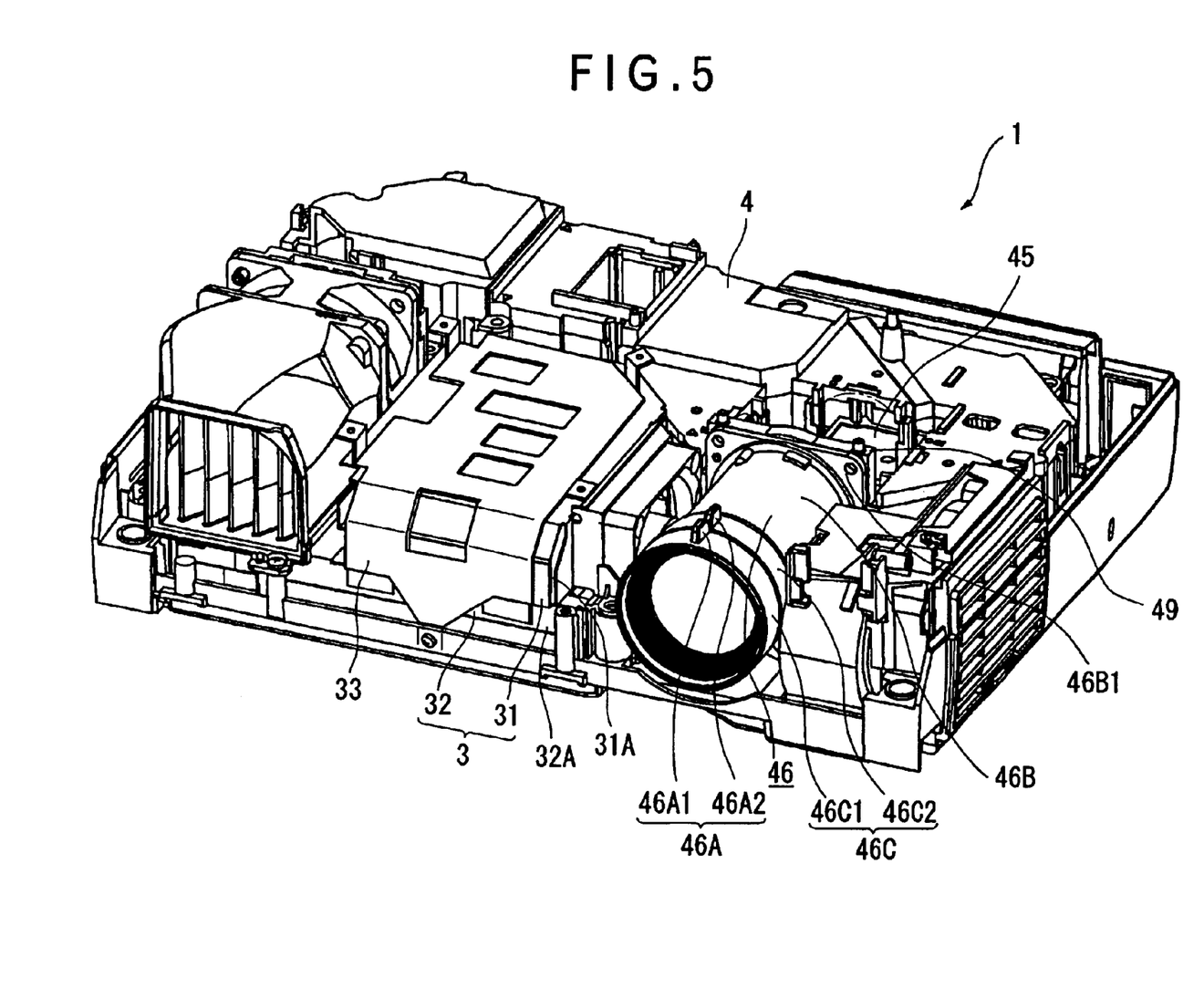
FIG. 5 is a perspective view showing the inside of the projector according to the aforesaid embodiment, which specifically shows the projector seen from front side with upper shield plate and circuit board thereof being removed from the condition shown in FIG. 4.

FIGS. 4 and 5 are perspective views showing the inside of the projector 1.

Specifically, FIG. 4 is an illustration where the upper case 21 of the projector 1 is removed from the condition shown in FIG. 2. FIG. 5 is an illustration seen from the front side where the front case 23, an upper shield 34, and a control board 5 are removed from the condition shown in FIG. 4.

As shown in FIG. 4 or 5, the exterior case 2 is provided with a power source unit 3 disposed at approximately center of the front side of the projector 1, an optical unit 4 having approximately planarly-viewed L-shape disposed on the rear side and right side of the power source unit 3, the control board 5 disposed above the units 3 and 4, and an exhaust duct unit 6 disposed on an end of the optical unit 4 toward the front side.

The power source unit 3 includes a power source 31 and a lamp driving block (ballast) 32 disposed below the power source 31.

The power source 31 supplies the electric power from the outside to the lamp driving circuit 32, the control board 5 etc. through a not-illustrated power cable connected to the inlet connector 22B.

The lamp driving circuit 32 supplies electric power fed by the power source 31 to a light source lamp (not shown in FIGS. 4 and 5) constituting the optical unit 4, which is electrically connected to the light source lamp. The lamp driving circuit 32 is, for instance, wired to a not-illustrated board.

The power source 31 and the lamp driving circuit 32 are vertically arranged approximately in parallel, which occupy the space extending in right and left direction on the front side of the projector 1.

The power source 31 and the lamp driving circuit 32 are respectively covered with case members 31A and 32A having right and left sides being opened, the surface of the case members 31A and 32A being processed by plating, metal vacuum evaporation, foliation etc. The case members 31A and 32A prevent leakage of electromagnetic noise between the power source 31 and the lamp driving circuit 32 and works as a duct for introducing the cooling air.

The power source 31 and the lamp driving circuit 32 are covered with a metal lower shield 33 having rectangular opening, so that electromagnetic noise from the power source 31 and the lamp driving circuit 32 toward the outside can be prevented.

Figure 6:
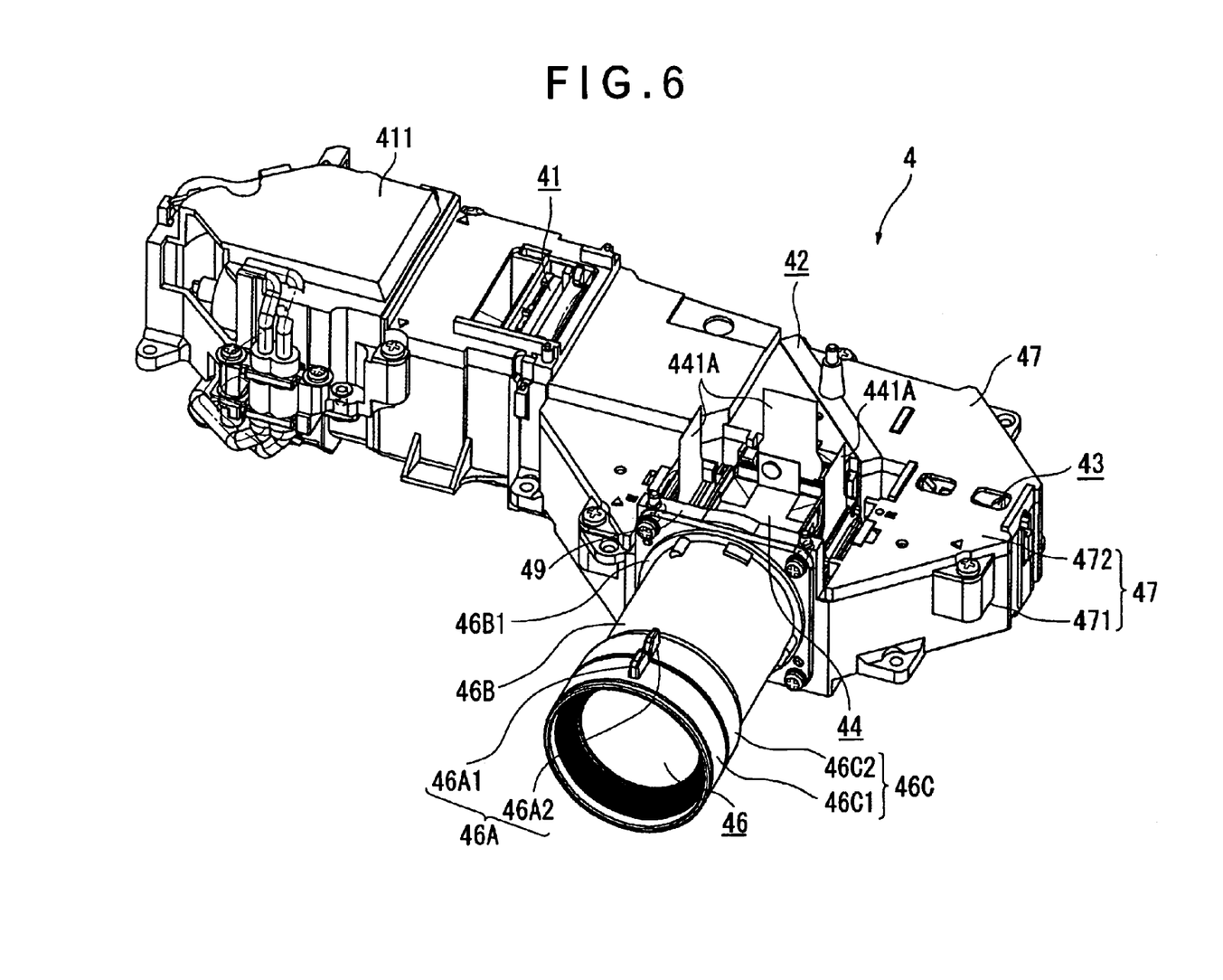
FIG. 6 is a perspective view showing an optical unit seen from above according to the aforesaid embodiment.

FIG. 6 is a perspective view showing an optical unit 4.

As shown in FIG. 6, the optical unit 4 optically processes the light beam irradiated by the non-illustrated light source lamp constituting a light source 411 to form an optical image in accordance with image information and enlarges and projects the optical image, which includes an integrator illuminating optical system 41, a color separating optical system 42, a relay optical system 42, an optical device 44, the projection lens 46 and a light guide 47 for housing the optical components 41 to 46. The details of the optical unit 4 will be described below.

Though not specifically shown in FIG. 4, the control board 5 is a single substrate installed with a controller including a CPU etc. and an interface including the various connectors 5A as a connection terminal, in which the controller controls the liquid crystal panel constituting the optical device 44 in accordance with the image information inputted through the connector 5A.

As shown in FIGS. 4 and 5, the control board 5 is provided on the upper side of the lower shield 33. Further the metallic upper shield 34 is disposed above the control board 5. The upper shield 34 and the lower shield 33 are mutually fixed with the control board 5 sandwiched therebetween. Accordingly, the leakage of the electromagnetic noise from the power source unit 3 and the control board 5 toward the outside can be prevented.

As shown in FIG. 4 or 5, the exhaust duct unit 6 exhausts the air staying within inside the projector 1 to the outside of the projector 1, which includes an axial-flow fan 6A and the exhaust duct 6B.

[2. Detailed Construction of Optical Unit]

Figure 7:
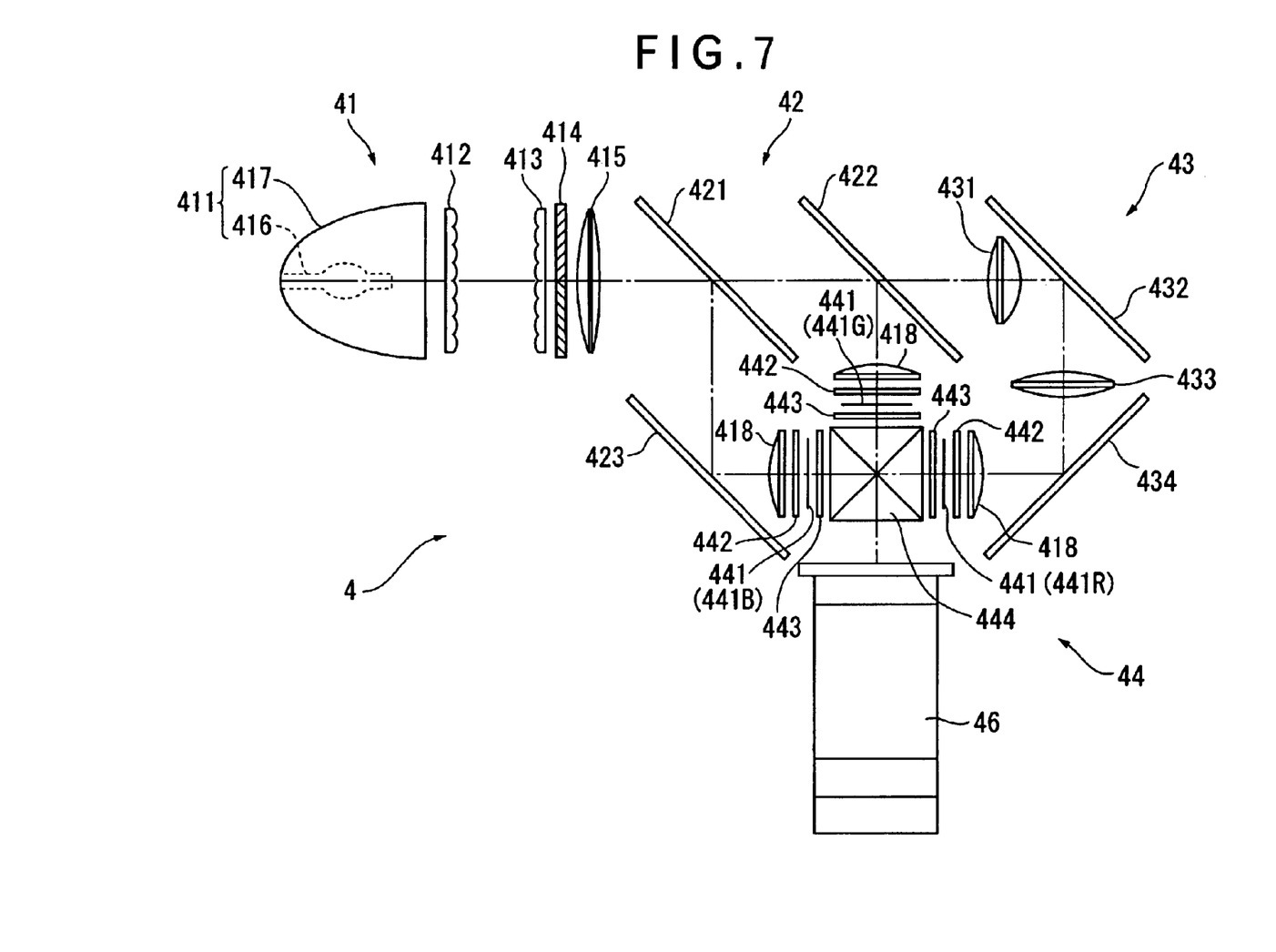
FIG. 7 is a plan view schematically showing an optical unit according to the aforesaid embodiment.

FIG. 7 is a plan view schematically showing the optical unit 4 shown in FIG. 6.

As shown in FIG. 7, the optical unit 4 includes the integrator illuminating optical system 41, the color separating optical system 42, the relay optical system 43, the optical device 44 and the projection lens 46 as a projection optical system.

The integrator illuminating optical system 41 is a system for substantially uniformly illuminating the image formation area of the three liquid crystal panels 441 constituting the optical device 44 (respectively referred to as liquid crystal panel 441R, 441G and 441B for every color lights of red, green and blue), which includes a light source 411, a first lens array 412, a second lens array 413, a polarization converter 414 and a superposing lens 415.

The light source 411 has a light source lamp 416 as a radiation light source and a reflector 417, which changes the radial light beam irradiated by the light source lamp 416 into a parallel light beam by the reflector 417 to emit the parallel light beam toward the outside.

A halogen lamp is used as the light source lamp 416. Incidentally, metal halide lamp and a high-pressure mercury lamp etc. may be used instead of the halogen lamp.

A parabolic mirror is used as the reflector 417. Incidentally, a combination of parallelizing concave lens and ellipsoidal mirror may be used instead of the parabolic mirror.

The first lens array 412 is a plurality of small lenses arranged in matrix, the lenses having substantially rectangular profile viewed from optical axis direction. The respective lenses split the beam emitted from the light source lamp 416 into a plurality of sub-beams. The profile of the respective lenses is approximately similar to the configuration of the image formation area of the liquid crystal panel 441. For instance, when the aspect ratio (ratio of horizontal and vertical dimensions) of the liquid crystal panels 441 is 4:3, the aspect ratio of the respective lenses is also set as 4:3.

The second lens array 413 has approximately the same arrangement as the first lens array 412, where the small lenses are disposed in matrix. The second lens array 413 as well as the superposing lens 415 focuses the image from the respective small lenses of the first lens array 412 onto the liquid crystal panel 441.

The polarization converter 414 is disposed between the second lens array 413 and the superposing lens 415 and is integrated with the second lens array 413 as a unit. The polarization converter 414 converts the light from the second lens array 413 to a single polarized light in order to enhance light utilization efficiency in the optical device 44.

Specifically, the respective sub-beams converted into single polarized light by the polarization converter 414 are substantially superposed on the liquid crystal panel 441 of the optical device 44 by superposing lens 415. Since the projector 1 using the liquid crystal panel 441 for modulating polarized light can use only single polarized light, approximately half of the light from the light source lamp 416 emitting other random polarized light cannot be used. Accordingly, by using the polarization converter 414, all of the light emitted from the light source lamp 416 is converted into single polarized light to enhance light utilization efficiency in the optical device 44.

Incidentally, such polarization converter 414 is disclosed in, for instance, Japanese Patent Laid-Open publication No. Hei 8-304739.

The color separating optical system has two dichroic mirrors 421 and 422 and a reflection mirror 423, the dichroic mirrors 421 and 422 separating the plurality of sub-beams irradiated by the integrator illuminating optical system 41 into three color lights of red (R), green (G) and blue (B).

The relay optical system 43 has incident-side lens 431, a relay lens 43 and reflection mirrors 432 and 434, and introduces the red color light separated by the color separating optical system 42 onto the liquid crystal panel 441R.

At this time, the red light component and the green light component of the light beam irradiated from the illuminating optical integrator system 41 are transmitted through the dichroic mirror 421 of the color separating optical system 42 and the blue light component is reflected by the dichroic mirror 421. The blue light reflected by the dichroic mirror 421 is reflected by the reflection mirror 423, which reaches to the liquid crystal panel 441B for blue-color through a field lens 418. The field lens 418 converts the respective sub-beams emitted from the second lens array 413 into a light beam parallel to central axis (main beam) thereof. The field lenses 418 provided in front of the other liquid crystal panels 441G and 441B function in the same manner.

In the red light and the green light transmitted through the dichroic mirror 421, the green light is reflected by the dichroic mirror 422 to reach the liquid crystal panel 441G for green color through the field lens 418. On the other hand, the red color transmits through the dichroic mirror 422 to pass the relay optical system 43 and reach the liquid crystal panel 441R for red color through the field lens 418.

Incidentally, the relay optical system 43 is used for the red color light in order to prevent decrease in utilization efficiency of light on account of light diffusion caused by longer length of the optical path of the red light than the length of the optical path of the other color lights, in other words, in order to directly transmit the sub-beam incident on the incident-side lens 431 to the field lens 418.

The optical device 44 is for modulating the incident light beam in accordance with image information to form a color image, which has three incident-side polarization plates 442, the liquid crystal panels 441R, 441G and 441B disposed on the after-stage of the respective incident-side polarization plates 442 as optical modulators, an irradiation-side polarization plate 443 disposed on the after-stage of the respective incident-side polarization plates 442, and a cross dichroic prism 444 as a color combining optical system.

The liquid crystal panels 441R, 441G and 441B use, for instance, a polysilicon TFT as a switching element.

In the optical device 44, the color lights separated by the color-separating optical system 42 are modulated by the three crystal panels 441R, 441G and 441B, the incident-side polarization plate 442 and the irradiation-side polarization plate 443 in accordance with image information to form an optical image.

The incident-side polarization plate 442 transmits only a polarized light of a predetermined direction among the respective color lights separated by the color separating optical system and absorbs the other light beam, which is constructed by forming a polarization film on a substrate of sapphire glass etc.

The irradiation-side polarization plate 443 is constructed in an approximately the same manner as the incident-side polarization plate 442, which transmits only a polarized light of a predetermined direction among the light beam irradiated by the liquid crystal panels 441 (441R, 441G and 441B) and absorbs the other light beam.

The polarization axes of the incident-side polarization plate 442 and the irradiation-side polarization plate 443 are set orthogonal with each other.

The cross dichroic prism 444 combines the optical image irradiated by the irradiation-side polarization plate 443 and modulated for respective color lights to form a color image.

A dielectric multi-layer film for reflecting red color light and a dielectric multi-layer film for reflecting blue color light are formed along boundary of four right-angled prisms of the cross dichroic prism 444, the dielectric multi-layer films combining three color lights.

The above-described liquid crystal panels 441, the irradiation-side polarization plate 443 and the cross dichroic prism 444 are constructed as an integrated unit of optical device body 45. Incidentally, the incident-side polarization plate 442 is slidably fitted and attached to a groove (not shown) formed on the light guide 47.

Figure 8:
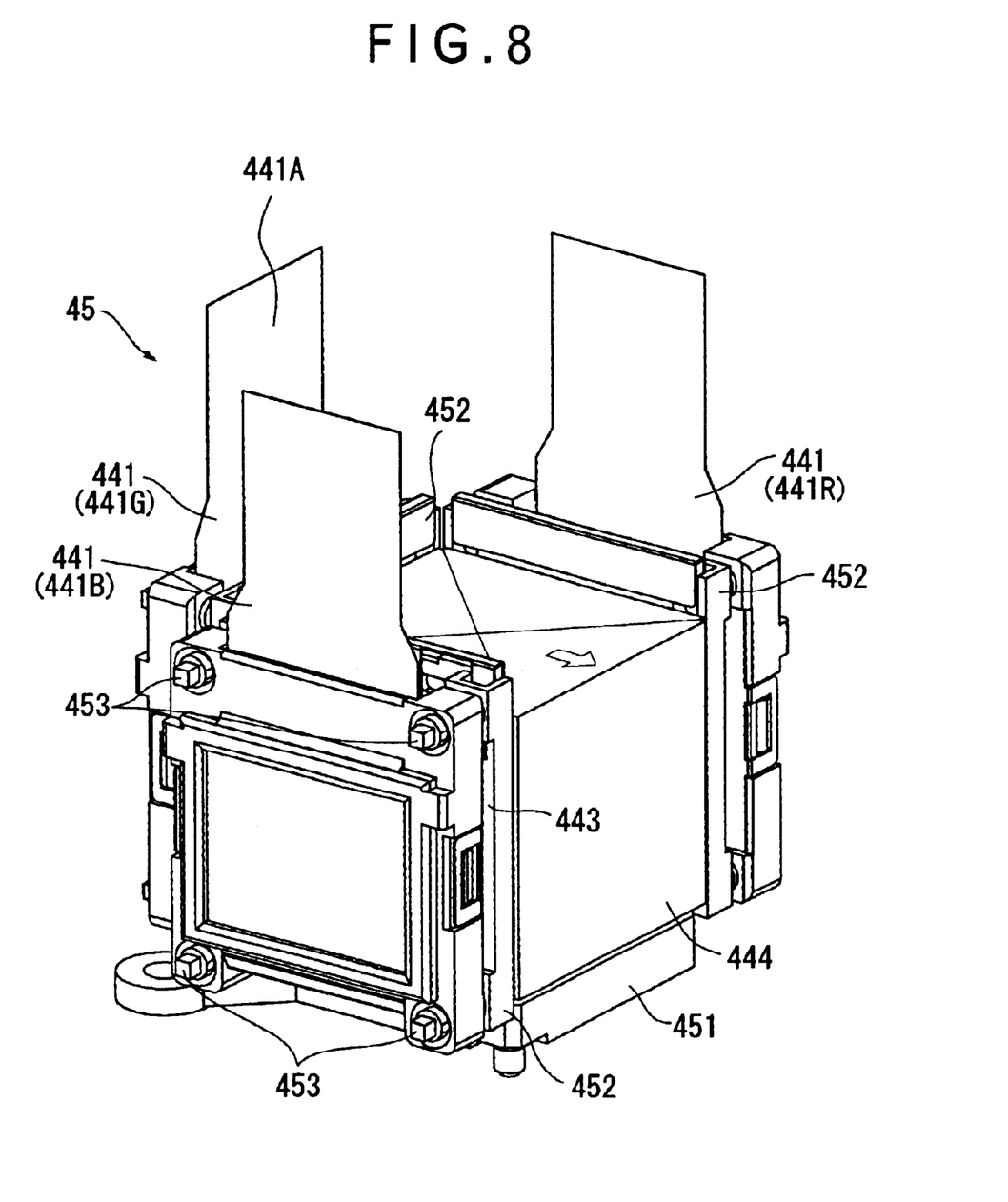
FIG. 8 is a perspective view showing an optical device integrating a liquid crystal panel and a prism seen from above according to the aforesaid embodiment.

FIG. 8 is a perspective view showing the optical device body 45.

As shown in FIG. 8, the optical device body 45 has the cross dichroic prism 444, a metal base 451 for supporting the cross dichroic prism 444 from the lower side, a metal holding plate 452 for holding the incident-side polarization plate 443 attached to the light-beam incident end of the cross dichroic prism 444, and liquid crystal panels 441 (441R, 441G and 441B) held by four pins 453 attached to the light-beam-incident side of the holding plate 452. A predetermined gap is secured between the holding plate 452 and the liquid crystal panel 441, so that the cooling air is flowed through the gap.

As shown in FIG. 7, the projection lens 46 enlarges and projects the color image combined by the cross dichroic prism 444 of the optical device 44.

The above-described optical systems 41 to 44 are housed in the light guide 47 made of synthetic resin as an optical component casing as shown in FIG. 6.

Though not specific illustration of the inside of the light guide 47 is omitted, as shown in FIG. 6, the light guide 47 has a lower light guide 471 having the groove for the respective optical components 412 to 415, 418, 421 to 423, 431 to 434 and 442 shown in FIG. 7 to be slidably fitted from the above, and a lid-shaped lower light guide 472 for closing the upper opening side of the lower light guide 471.

Further, as shown in FIG. 6, the light source 411 is housed on an end of the light guide 47 of approximately planarly-viewed L-shape, and the projection lens 46 is screwed and fixed on the other end through a head 49.

[3. Structure of Projection Lens]

As shown in FIG. 6, the projection lens 46 enlarges and projects the color image combined by the cross dichroic prism 444 of the optical device body 45, which includes a linearly-advancing barrel 46B fixed to the head 49, a cam barrel 46C provided with a lever 46A and, though not illustrated, zoom-magnification converting lenses, focus-adjusting lenses and a fixed lens as a reference of the lenses.

The projection lens 46 converts magnification of projected image and adjusts focus of the image by changing relative position of the zoom-magnification-converting lenses and focus-adjusting lenses relative to the fixed lens.

In order to move with high accuracy, the lenses are housed in a movable lens-barrel (not shown) for respectively supporting the lenses.

The linearly-advancing barrel 46B is provided with a flange 46B1 on a rear end of the outer circumference thereof to be fixed to the head 49 of the projector 1.

The movable lens barrel for supporting the lenses are installed inside the linearly-advancing barrel 46B in a manner movable in optical axis direction, and the fixed lens is fixed on the rear side thereof.

The cam barrel 46C is composed of a focus-adjusting cam barrel 46C1 and a zoom-adjusting cam barrel 46C2 for conducting focusing and zooming operation of the projected image, the cam barrels 46C being rotatably supported by the linearly-advancing barrel 46B on the outer circumference thereof.

The cam barrel 46C engages with the movable lens-barrel and the engagement of the cam is changed by rotating the cam barrel 46C, so that the movable lens-barrel is moved in the optical axis direction to change the relative position of the lenses.

The projection lens 46 can set wide-end for enlarging projected image and tele-end for reducing the size of the projected image, where a lever 46A2 of the zoom-adjusting cam barrel 46C2 is moved in right and left direction in FIG. 6 so that the projected image can be set at the wide-end and tele-end.

Incidentally, a not-illustrated motor electrically connected with the operating portion 25 is provided to the projection lens 46, so that focusing and zooming of the projection lens 46 can be automatically operated as well as manual operation by the lever 46A.

The linearly-advancing barrel 46B and the cam barrel 46C constituting the projection lens 46 is made of polycarbonate.

Further, the head 49 of the light guide 47 on which the linearly-advancing barrel 46B of the projection lens 46 is fixed is made of grass-fiber containing synthetic resin (unsaturated polyester+BMC: bulk molding compound).

Incidentally, the linearly-advancing barrel 46B, the cam barrel 46C and the head 49 can be made of plastic material other than polycarbonate such as Cool Poly (RS007).

[4. Structure of Control Board]

As shown in FIG. 4, the control board is planarly superposed above the optical unit 4 and the power source unit 3, where the lower side of the control board 5 and the upper side of the optical unit 4 are spaced apart by ten millimeters.

The connectors 5A as an interface with an external device is provided on the rear side of the control board 5.

The connector 5A includes a RGB input terminal 5A1 for a component signal to be inputted, S-video/Video input terminals 5A2, 5A3, audio input terminal 5A4 and USB terminal 5A5, thus enabling visual presentation by personal computer data and viewing various image sources such as DVD, video, video camera as well as personal computer data.

An image signal processing circuit as a controller for processing the image signal and sound signal from the connector 5A is formed on the upper side of the control board 5, on which circuit elements such as CPU and memory are installed.

Further, in order to regulate and smooth the electric current supplied from the power source 31 of the power source unit 3, a smoothing circuit is formed, on which a capacitor, choke coil etc. are installed.

Holes 5B penetrating the upper and lower sides of the portion corresponding to the respective liquid crystal panels 441 are formed on the control board 5, into which switching element, picture element electrode and flexible print board 441A (FIGS. 6 and 8) electrically connected with an opposing electrode of an opposing board are inserted. Accordingly, a connector for connecting the flexible print board 441A and the control board 5 is provided around the hole 5B.

[5. Cooling Mechanism]

The projector 1 has a panel cooling system A for mainly cooling the liquid crystal panel 441, a light source cooling system B for mainly cooling the light source 411 and a power source cooling system C for mainly cooling the power source unit 3.

Figure 9:
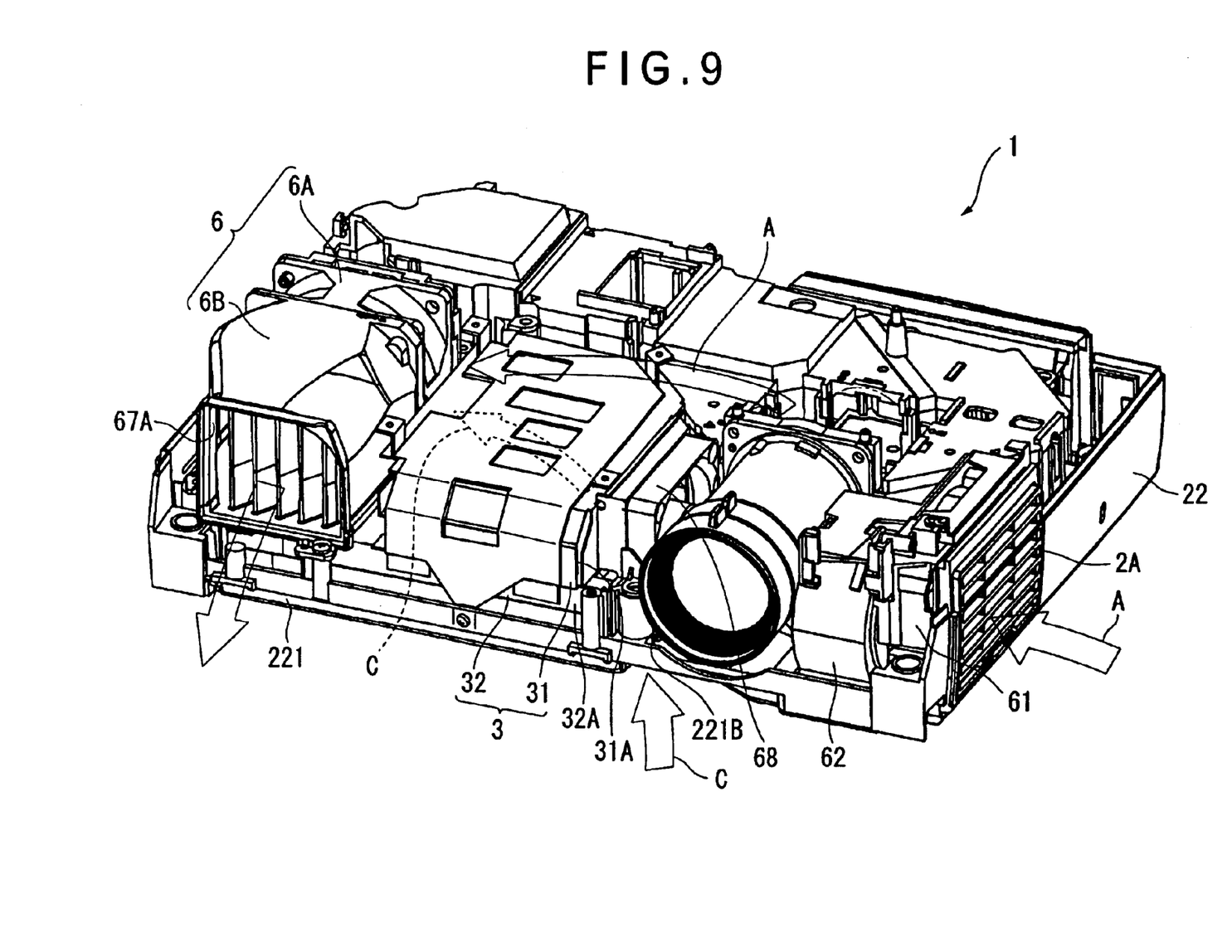
FIG. 9 is an illustration showing a flow of cooling air of a panel cooling system A and a power source cooling system C according to the aforesaid embodiment.
Figure 10:
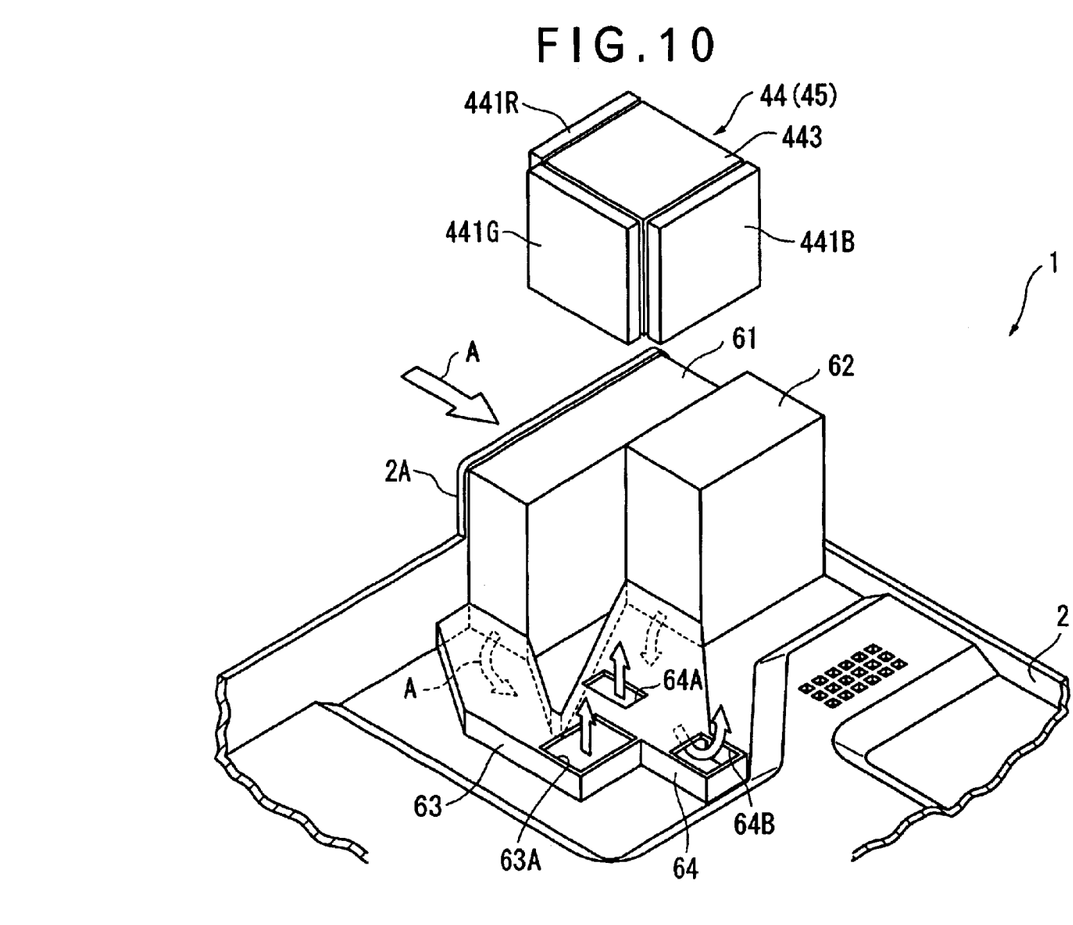
FIG. 10 is an illustration showing a flow of cooling air of a panel cooling system A according to the aforesaid embodiment.
Figure 11:
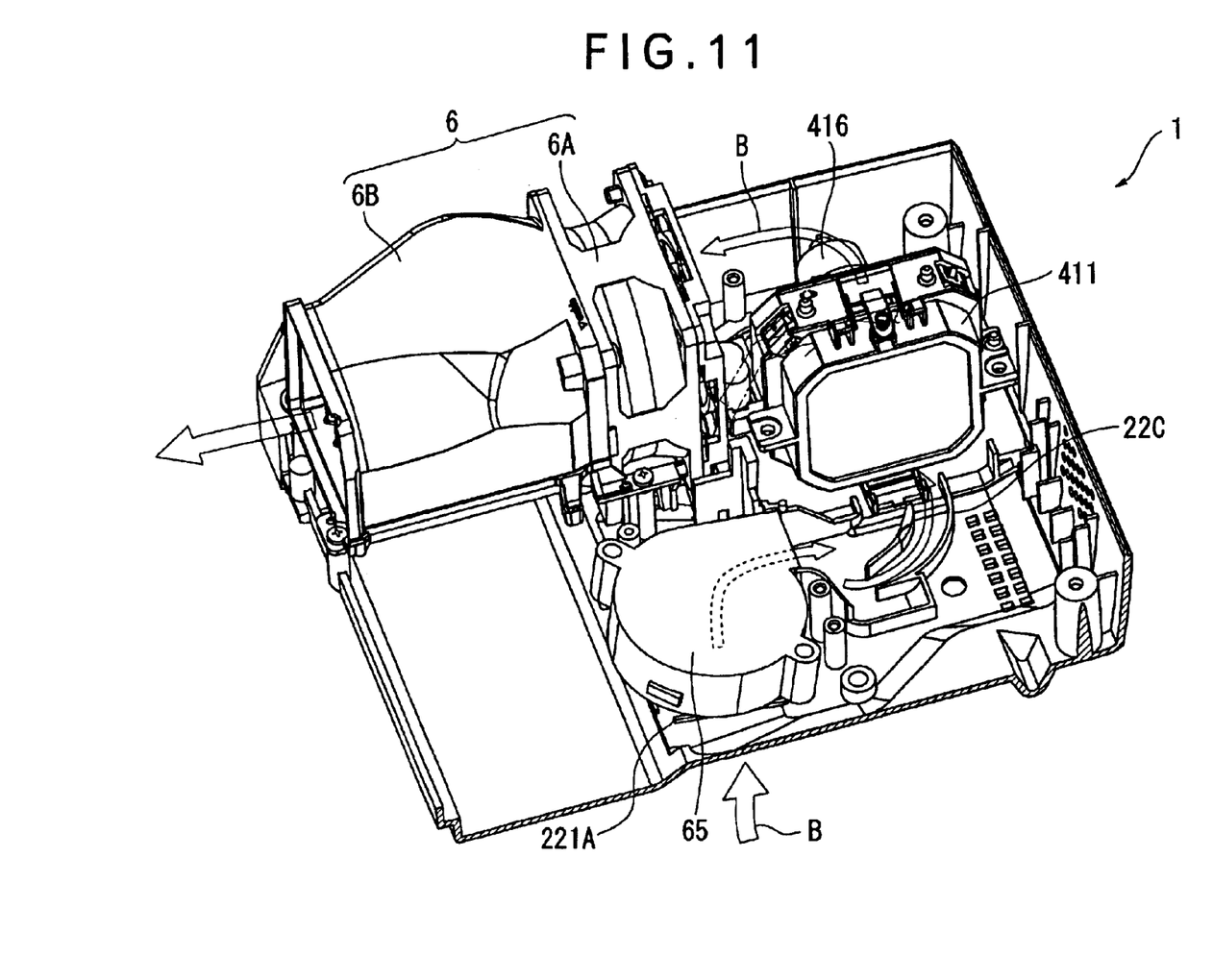
FIG. 11 is an illustration showing a flow of cooling air of a light source cooling system B according to the aforesaid embodiment.

FIG. 9 is an illustration identical with FIG. 5 adding arrows indicating airflow of the cooling air, which shows the flow of the cooling air inside the projector 1 including the power source cooling system C. FIG. 10 is a perspective view schematically showing a structure of the lower side of the optical device body 45 for explaining the panel cooling system A. FIG. 11 is a perspective view showing the structure on the lower side of the power source unit 3 and the light guide 47 for explaining the light source cooling system B.

In FIG. 9, two sirocco fans 61 and 62 are disposed on the right side of the projection lens 46 in the panel cooling system A. Further, as shown in FIG. 10, ducts 63 and 64 respectively connected to the fans 61 and 62 are used in the panel cooing system A.

As shown in FIG. 10, the sirocco fans 61 and 62 inhale outside cooling air from the inlet hole 2A on a side of the exterior case 2 and discharge the inhaled cooling air to the ducts 63 and 64 respectively. Incidentally, the size of the sirocco fan 62 is greater than the sirocco fan 61.

The duct 63 guides the cooling air discharged by the sirocco fan 61 toward lower side of the optical device 44, where a rectangular opening 63A is formed at a position corresponding to the lower side of the liquid crystal panel 441G for green color light.

The duct 64 guides the cooling air discharged by the sirocco fan 62 to the lower side of the optical device 44, where rectangular openings 64A and 64B are respectively formed at a position corresponding to the lower side of the liquid crystal panels 441R and 441B respectively for red color light and blue color light.

Though not shown, an opening is formed on the bottom side of the lower light guide at a position corresponding to the openings 63A, 64A and 64B.

Accordingly, as shown in FIG. 10, the cooling air inhaled by the sirocco fans 61 and 62 of the panel cooling system A flows to cool the incident-side polarization plate and the irradiation-side polarization plate which is not illustrated in FIG. 10, in addition to the respective liquid crystal panels 441R, 441G and 441B.

Further, as shown in FIG. 9, the cooling air which has cooled the liquid crystal panels 441R, 441G and 441B upwardly from the lower side is drawn to the side of the axial-flow fan 6A on the left side viewed from the front side while cooling the lower side of the circuit board (not shown in FIG. 9) and is discharged from the exhaust hole on the front side of the exterior case (not shown in FIG. 9).

In FIG. 11, a sirocco fan 65 provided on the lower side of the power source unit 3, the axial-flow fan 6A and the exhaust duct 6B attached to the axial-flow fan 6A are used in the light source cooling system B.

The cooling air inhaled from the inlet hole 221A of the lower case 22 by the sirocco fan 65 flows along a guide 22C formed on the inner side of the bottom portion 221 of the lower case 22 and, thereafter, enters in the light source 411 to cool the light source lamp 416 to be flowed out toward the outside of the light source 411. The cooling air flowed out of the light source 411 is drawn by the axial-flow fan 6A in the same manner as the panel cooling system A to be discharged from the exhaust hole on the front side of the exterior case (not shown in FIG. 11) through the exhaust duct 6B.

In FIG. 9, an axial-flow fan 68 provided on the right side of the power source unit 3 is used in the power source cooling system C.

The cooling air inhaled by the axial-flow fan 68 from the inlet hole 221B formed on the bottom portion 221 of the lower case 22 flows from the right side to the left side viewed from the front side along the case members 31A and 32A while cooling the power source block 31 and the light source driving block 32. Subsequently, most of the cooling air is drawn by the axial-flow fan 6A as in the other cooling system A and B and is discharged from the not-illustrated exhaust hole on the front side of the exterior case. Incidentally, a part of the air is directly discharged from the exhaust hole of the exterior case without being drawn by the axial-flow fan 6A.

The axial-flow fan 68 not only cools the power source unit 3, but also prevents physical deformation of the projection lens 46 caused when the temperature of the projection lens 46 is raised by drawing the heat of the projection lens 46 that is raised by heat conductance and radiation from the heating elements inside the projector 1.

[6. Advantage of Embodiment]

According to the above-described embodiment, following advantages can be obtained.

(1) Since the linear-advancing barrel 46B and the cam barrel 46C of the projection lens 46 are made of plastic member of polycarbonate, the weight of the projection lens 46 can be reduced, thereby reducing the weight of the projector 1.

(2) Since the linear-advancing barrel 46B and the cam barrel 46C of the projection lens 46 is made of a plastic member of polycarbonate, even when the projection lens 46 and the electronics components radiating electromagnetic wave are adjacently disposed, there is no electromagnetic coupling between the projection lens 46 and the electronics components, thus avoiding secondary radiation of electromagnetic wave caused when the projection lens 46 electrically resonates and works as an antenna.

Accordingly, the projection lens 46 and the circuit elements radiating electromagnetic wave such as CPU and memory or the projection lens 46 and the power source 31 and the power source unit 3 of the lamp driving circuit 32 can be adjacently disposed, thereby enhancing size reduction of the projector 1.

(3) Since the linearly-advancing barrel 46B and cam barrel 46C of the projection lens 46 are made of plastic member of polycarbonate, it is not necessary to provide a shield member between the projection lens 46 and the control board 5 for preventing electromagnetic coupling between the projection lens 46 and the control board 5, thus omitting components and reducing production cost.

(4) Since the linearly-advancing barrel 46B and the cam barrel 46C of the projection lens 46 are made of plastic member of polycarbonate, it is not necessary to provide wide distance between the circuit elements installed on the control board 5 and the projection lens 46 and, even when the distance between the projection lens 46 and the control board 5 installed with the circuit elements is within forty millimeters, the projection lens 46 does not work as an antenna and does not cause secondary radiation of electromagnetic wave.

Further, the projection lens 46 does not work as an antenna for the power source 31 or the lamp driving circuit 32 that radiates electromagnetic wave, the CPU or memory on the control board 5 is not influenced by the secondary radiation of the electromagnetic wave from the projection lens 46, so that disturbance of projected image and malfunction can be prevented.

Accordingly, since the projection lens 46 and the control board 5 can be closely located within forty millimeters gap, the design inside the projector 1 can be facilitated and size of the projector 1 can be reduced.

(5) Since the head 49 formed on the light guide 47 to be fixed to the flange 46B1 of the linear-advancing barrel 46B of the projection lens 46 is made by plastic member of polycarbonate in the same manner as the projection lens 46, the head 49 does not work as an antenna for the electromagnetic wave radiated by the circuit elements on the control board 5, or the power source 31 and the lamp driving circuit 32, thereby preventing the second radiation of the electromagnetic wave by the head 49.

(6) Since the head 49 is made of plastic member of polycarbonate, the weight of the head 49 can be reduced, thus reducing the weight of the projector 1.

(7) Since the axial-flow fan 68 is provided adjacent to the projection lens 46, temperature increase of the projection lens 46 on account of heat conduction or thermal radiation from heating elements located inside the projector 1 can be avoided, thus preventing physical deformation of the projection lens on account of high temperature.

[7. Modification of Embodiment]

Incidentally, the scope of the present invention is not restricted to the above embodiment, but includes other arrangement as long as an object of the present invention can be achieved, which includes following modifications.

Though the projection lens 46 of the above-described embodiment is composed of zoom-magnification converting lenses, focus adjusting lenses and fixed lens as a reference for the lenses, the projection lens 46 may be composed of more than three lenses.

Though a projector using three optical modulators is taken as an example in the above-described embodiment, the present invention can be applied to a projector having a single, two, or more than three optical modulators.

Though the liquid crystal panel is used as the optical modulator, an optical modulator other than liquid crystal such as a device using a micro-mirror may be used.

Though a front-type projector where the image is projected from a direction for viewing the screen is taken as an example in the above-described embodiment, the present invention may be applied to a rear-type projector where the image is projected from a direction opposite to the direction for viewing the screen.

What is claimed is:

1. A projector, comprising:

an electric optical device that modulates a light beam irradiated by a light source in accordance with image information;

a projection lens that enlarges and projects the light beam modulated by the electric optical device; and a control board that controls the electric optical device in accordance with the image information, wherein the projection lens has a plurality of beam-condensing elements and a lens-barrel that houses the plurality of beam-condensing elements, wherein the control board is disposed adjacent to the projection lens, and wherein the lens-barrel is made of non-metal member.

2. The projector according to claim 1, wherein the control board is located along a plane defined by an optical path from the light source to the projection lens, the control board planarly covering the lens barrel.

3. The projector according to claim 1, wherein the distance between a circuit element installed on the control board and the lens barrel is within forty millimeters.

4. The projector according to claim 1, further comprising an optical component casing that houses optical components disposed on an optical path from the light source to the electric optical device, wherein a base end of the lens barrel is fixed to a head formed on the optical component casing, the head being formed of a non-metal member.

5. The projector according to claim 1, wherein a cooling fan is located adjacent to the lens barrel.

* * * * *